Oct. 18, 1960　　G. A. GOEPFRICH ET AL　　2,956,728
RELIEF AND DRAIN VALVE FOR COMPRESSORS
Filed Sept. 28, 1955
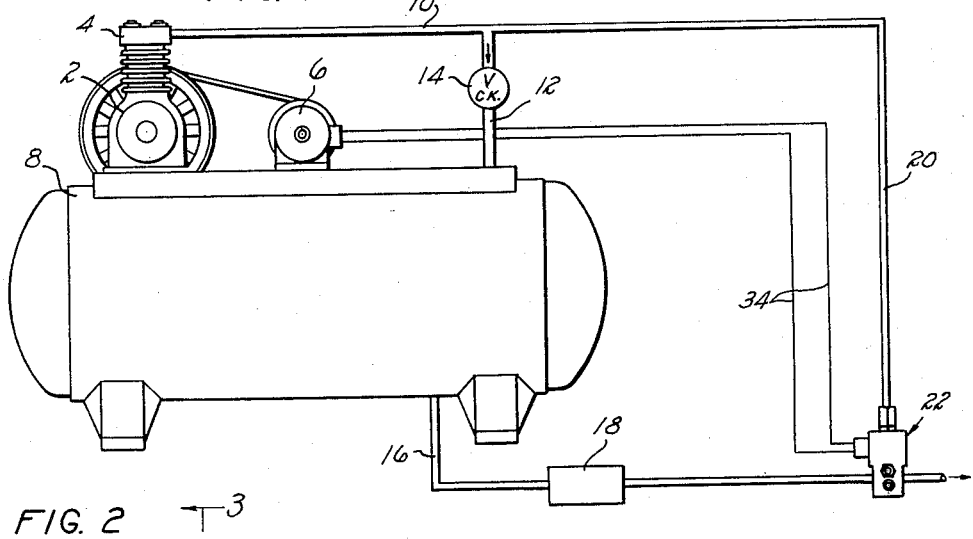
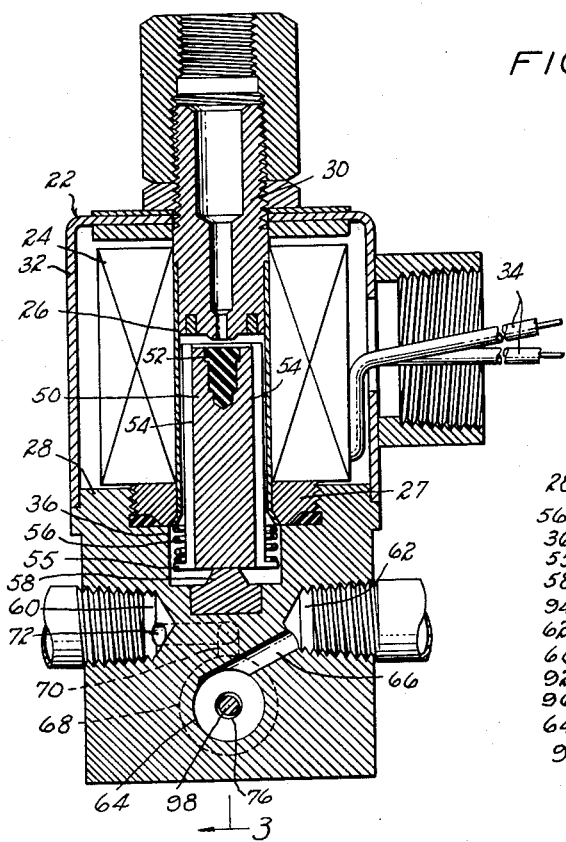
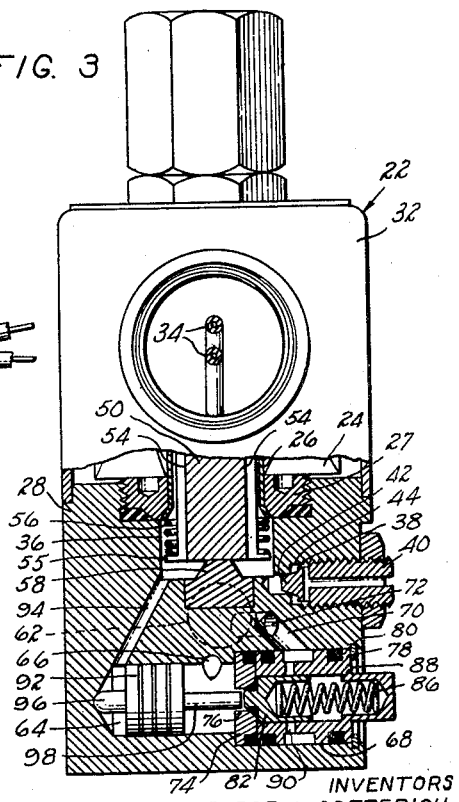
INVENTORS
GEORGE A. GOEPFRICH
LAWRENCE PADULA
BY *Lindsey and Prutzman*
ATTORNEYS

United States Patent Office 2,956,728
Patented Oct. 18, 1960

2,956,728

RELIEF AND DRAIN VALVE FOR COMPRESSORS

George A. Goepfrich and Lawrence Padula, New Britain, Conn., assignors to The Skinner Chuck Company, New Britain, Conn., a corporation of Connecticut Filed Sept. 28, 1955, Ser. No. 537,164

12 Claims. (Cl. 230—1)

This present invention relates to solenoid valves and more particularly to a dual purpose automatic solenoid valve particularly suitable for use with air-compressing systems.

In air compressing systems employing a tank or receiver for accumulating the compressed air, condensation of water vapor from the air in the tank causes water to collect in the bottom of the tank. To avoid rust and prevent such water from getting into the compressed-air delivery lines supplied by the tank, it is necessary to drain the water from the tank at frequent intervals. Also in such systems the compressor generally does not run continuously, but is run only for short periods as frequently as necessary to replace air drawn from the receiver and maintain the desired receiver pressure level. To make the compressor easy to start under such circumstances it is customary to unload the compressor head by bleeding the compressed air therefrom each time the compressor stops running.

Accordingly one object of the present invention is to provide a dual purpose solenoid valve particularly suited for use with an air compressing system of the type referred to for automatically controlling both unloading of the compressor head and draining of condensate from the receiver each time the compressor stops running.

Another object is to provide such a solenoid valve having means for adjusting the rate of air bleed from the compressor head and wherein the rate of air bleed controls the length of the interval during which condensate is drained from the receiver.

Another object is to provide a valve of the type referred to which is fully automatic and completely dependable in operation, which is easy to install, and which simplifies the piping of the compressor system.

Another object is to provide a solenoid valve having improved means of novel and simplified construction for controlling the flow of two fluids, one in response to the other.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a schematic view of a compressor system of the type referred to provided with a solenoid valve constructed in accordance with the present invention;

Figure 2 is a vertical sectional view of a solenoid valve constructed in accordance with the invention; and Figure 3 is a right hand view of the structure of Figure 2 partly sectionalized on the line 3—3 thereof.

Referring to Figure 1 of the drawing a compressor system of the type with which the valve of the present invention is particularly suitable includes a compressor 2 having a head 4 and driven by an electric motor 6. Air compressed in the head 4 is piped to the tank or receiver 8 through pipes 10, 12 and check valve 14. The tank 8 has a drain line 16 through which the condensate which collects in the tank is removed, and a strainer 18 in the drain line removes scale, sediment, and the like from this water. An air-bleed line 20 is connected to the compressor head 4 through the pipe 10. In accordance with the present invention, both bleeding of air through line 20 and drainage of water through line 16 is automatically controlled by a single unit dual purpose solenoid valve 22.

Referring to Figure 2 the valve 22 includes an electromagnetic coil 24 through which extends a sleeve 26 secured by a threaded collar 27 at its lower end to a base or body portion 28. In the upper end of the sleeve is a nipple forming an air inlet 30 which is adapted to be connected to the air bleed line 20. The coil 24 is enclosed by a casing 32 secured to the body 28 and having a laterally extending fitting through which extend the lead-in wires 34 for the coil. Wires 34 are adapted to be connected in circuit with the starting switch of motor 6, so that the coil will be energized when the compressor is running, and de-energized when the compressor is not running.

Opposite the lower end of the sleeve the body has a cylindrical chamber 36 which together with the sleeve forms an air flow passage from the air inlet. Connecting with chamber 36 is a bore forming an air outlet 38 in which is threaded an air bleed valve 40. A tapered portion 42 on the inner end of the bleed valve co-operates with a shoulder 44 in the air outlet to regulate the rate of air flow through the outlet as the bleed valve is screwed in or out. A lock nut on the outer end of the bleed valve permits the valve to be secured in adjusted position.

Freely slidable in the sleeve 26 is a reciprocable armature 50 having an insert of resilient material 52 at its upper end which co-operates with the inner end of the air inlet to valve air flow from the air inlet 30 to the air outlet 38. Grooves 54 in the sides of the armature facilitate free flow of air from the upper to the lower end thereof. The armature has a flange 55 at its lower end between which and the lower end of sleeve 26 is a compression spring 56 which biases the armature downwardly against a stop 58 in the bottom of chamber 36. Thus, in the normal or unenergized condition of the valve the armature is in the position shown in Figure 2, and air may flow freely from the air inlet to the air outlet, and when the valve is energized air flow through the inlet is shut off.

Below chamber 36 the valve body 28 is bored out laterally at diametrically spaced points to form a water inlet 60 adapted to be connected to drain line 16 and a water outlet 62. Beneath the water inlet and outlet the body is further bored out to form a diametrically extending passage having a reduced diameter portion 64 connected to the water outlet through a drilled passage 66, and an enlarged diameter portion 68 connected to the water inlet through drilled passages 70, 72. The two portions of the bore 64, 68 form a shoulder against which is supported a disc-shaped valve seat 74 having a central opening 76 and a beveled conical seating surface.

On the right hand side of the valve seat 74 is a water drain valve including a stationary cylindrical casing 78 secured against seat 74 by a snap ring 80 and a valve member 82 telescopically slidable in the casing. Valve member 82 has a conical left hand end fitted with a ring of resilient material arranged to seal against valve seat 74. A spring 86 within the casing urges valve member 82 to the left to seated position and a shoulder 88 in the casing provides a stop limiting right hand or opening movement of the valve member. The interior of casing 78 is connected to passage 70 by radial ports 90 which are covered by valve member 82 when seated and uncovered when the valve member is fully open.

In accordance with the invention, the water drain valve is arranged to be opened automatically by the pressure of the bleed air flowing between the air inlet 30 and air outlet 38. To this end the left hand of bore 64 is connected to chamber 36 through a passage 94, and a reciprocable piston 92 is provided in the bore. A projection 96 on the left side of the piston prevents it from covering passage 94, and a rod 98 extending from its right hand side is arranged to penetrate the opening 76 in the valve seat and unseat valve member 82 when the piston is moved to the right. The diameter of the rod 98 is substantially smaller than opening 76 so that water will be able to flow freely through the opening 76 when valve member 82 is unseated. The rod 98 and bore 64 are so related in length as to permit valve member 82 to close fully when the piston is in its extreme left hand position, yet provide a space between the piston and valve seat 74 such that the piston will not cover passage 66 when it is moved to the right sufficiently to open the valve member 82 fully.

The operation of the valve and air-compressor system is as follows. When the compressor is not running the coil of the solenoid valve is de-energized and the spring 56 holds the armature down so that the compressor head is opened to atmosphere through the bleed line 20, the air flow passage in the valve through sleeve 26 and chamber 36, and bleed valve 40. Thus, the compressor head is completely unloaded and minimum power is required to start the compressor. When the start switch for the motor is thrown the solenoid coil is energized and the armature closes the air inlet and shuts off the air bleed line. After the compressor has run sufficiently to restore the receiver pressure to the proper level, the motor is turned off, which simultaneously de-energizes the solenoid coil and permits the armature to drop down to the position shown in Figure 2, opening the air inlet. Thereupon, compressed air in the head of the compressor commences to bleed off through the adjustable bleed valve 40, the rate of bleed being, of course, dependent on the adjustment of the valve 40. Simultaneously, the pressure of the air in the chamber 36 is transmitted through the passage 94 to the left hand side of the piston and displaces the piston to the right, moving the valve member 82 to the right and uncovering the radial ports 90. This connects the water inlet 60 with the water outlet 62 through passages 70, 72, the ports 90, the central opening 76 in the valve seat and passage 66, and the pressure of the air in the receiver then forces any water in the receiver out through the drain line 16 and water inlet to the water outlet.

When the air pressure in the valve has been bled to such a low value that the piston 92 can no longer hold the valve member 82 open against the force of spring 86, valve member 82 is closed, returning the piston to its left hand position, and water flow is shut off. Thus, the length of time that the water drain valve will be held open depends on how long the piston will be held in its right hand position by the air pressure in chamber 36, and since the rate at which this air pressure is dissipated is determined by the adjustment of the air bleed valve 40, it may be seen that the air bleed valve 40 provides a control of both duration of air bleed and duration of water drain. Normally valve 40 will be adjusted so that the duration of the air bleed and water drain periods will be a few seconds.

It is a particular advantage of the water drain valve that although water pressure on the right hand side of piston 92 tends to move the piston to the left when valve member 82 is open, thereby permitting the valve member 82 to close, the valve member 82 stabilizes at a position such that the pressure drop through ports 90 and opening 76 reduces the water pressure on the right hand side of piston 92 to a condition of balance with the air pressure on its left hand side. Therefore, during the time sufficient air pressure is applied to piston 92 to overcome the bias of spring 86, the valve member 82 stays open continuously without chattering or hammering on the seat 74, thereby avoiding attendant noise and wear.

Thus it may be seen that in a compressor system provided with a solenoid valve constructed according to the invention, any water in the receiver is automatically drained and the compressor head is automatically unloaded each time the compressor stops running. The valve combines these air bleed and water drain functions in a single unit which minimizes cost, permits convenient regulation of both air bleed duration and the duration of the water drainage with but a single adjustment, and substantially simplifies the piping of the compressor system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. A solenoid valve for connection to two fluid sources comprising a valve body having a first flow passage for connection to a first fluid source and provided with an inlet, chamber and a restricted outlet, a normally opened first valve in the inlet for controlling flow of the first fluid, solenoid means for closing the first valve, means forming a second flow passage in said valve body for connection to a second fluid source having a second inlet and second outlet, a normally closed second valve between the inlet and outlet of the second passage, and means communicating with the chamber in the first passage for opening the second valve responsive to fluid pressure in the chamber.

2. A solenoid valve for connection to two fluid sources comprising a valve body having a first flow passage for connection to a first fluid source and provided with an inlet, a chamber and a restricted outlet, a normally opened valve in the inlet for controlling flow of the first fluid, solenoid means for closing the valve, means forming a second flow passage in said valve body for connection to a second fluid source and having a second inlet and second outlet, a cylinder communicating with the chamber in the first fluid passage, a piston in the cylinder movable by pressure in the chamber, and a normally closed second valve in the second fluid passage operable by said piston.

3. A combination air-pressure relief and water drain valve comprising valve body formed with an air release passage way having an inlet, a chamber and a restricted outlet, a normally opened first valve in the air release inlet, a solenoid for closing the first valve, means forming a water drain passageway in the valve body having a second inlet and second outlet, a second valve disposed between the inlet and outlet of the water drain passageway normally closing the water drain passageway, and means for opening the last named valve including a piston, means forming a fluid passageway in the valve body between one end of the piston and the chamber in the air release passageway, and means forming a second fluid passageway between the other end of the piston and the water drain passageway between the outlet thereof and the second valve.

4. A combination air pressure relief water drain valve comprising a valve body formed with an air release passageway having an air inlet and an air outlet, an adjustable bleed valve in said air outlet, a normally opened first valve between the air inlet and air outlet, solenoid means for closing the first valve, a cylinder communicating at one end with said air release passageway between the outlet and the first valve, a piston in the cylinder movable in one direction by bleed air pressure between the first valve and the air outlet, a rod extending from the piston in said one direction, means forming a water drain passage in said valve body including a valve seat in the passage having a central opening larger than said rod through which the rod is adapted to extend when the piston moves in said one direction, a valve in the water drain passage on the opposite side of the valve seat from the piston and adapted to be unseated by the rod, said water drain passage including radial ports connected to a water inlet and covered by the valve in the seated position thereof, and a spring for biasing the valve to closed position.

5. In an air compressing system including a compressor, an electric motor drivingly connected to the compressor, a receiver communicating with the compressor, a check valve between the compressor and receiver, an air bleed line between the compressor and check valve, and a water drain line connected to the receiver, a combination compressor head relief and receiver water drain valve comprising a valve body having an air release passageway provided with a restricted outlet and having an inlet connected to the air bleed line, a normally opened first valve in the air release passageway between the inlet and outlet thereof, solenoid means for closing the valve, means for energizing the solenoid means when the electric motor is energized, means forming a water drain passageway in the valve body having an inlet connected to the water drain line, a normally closed valve in the water drain passageway, and pressure responsive means for opening the last named valve communicating with the air release passageway between the first valve and restricted outlet thereof.

6. In an air compressing system of the type including a compressor driven by an electric motor, an air bleed line connected to the compressor, a receiver having an inlet line provided with a check valve and connected to the compressor, and a water drain line connected to the receiver, a combination compressor air pressure relief and receiver water drain valve comprising a valve body formed with an air release passageway having an air inlet connected to the air bleed line and a restricted air outlet, a normally open first valve between the air inlet and the air outlet, solenoid means for closing the first valve connected in circuit with the electric motor so as to be energized when the compressor is running and de-energized when the compressor is not running, means forming a water drain passageway in the valve body having an inlet connected to the water drain line, means forming a cylindrical chamber in the valve body communicating with the air release passageway between the first valve and air outlet, a piston in the chamber responsive to air pressure, and a normally closed valve in the water drain passageway operated by the piston.

7. In an air compressing system of the type including a compressor, an electric motor for driving the compressor, a receiver connected to the compressor, a check valve between the compressor and receiver, an air bleed line connected between the compressor and check valve, and a water drain line connected to the receiver, a combination compressor air pressure relief and receiver water drain valve comprising a valve body having an air release passageway provided with an air inlet connected to the air bleed line and an air outlet having an adjustable bleed valve, a normally open control valve between the inlet and outlet, a solenoid coil connected in circuit with the motor, a reciprocable armature controlled by the coil and connected to the control valve to close said control valve when the compressor is running, means forming a water drain passageway in said valve body having an inlet connected to the water drain line, means forming a cylindrical chamber communicating with said air release passageway between the control valve and air outlet, a piston in the cylinder movable responsive to air pressure in said air release passageway, and a normally closed valve in said water drain passageway operable by said piston.

8. In an air compressing system of the type including a compressor, an electric motor for driving the compressor, a receiver connected to the compressor, a check valve between the compressor and receiver, an air bleed line connected between the check valve and the compressor, and a water drain line connected to the receiver, a combination compressor air pressure relief and receiver water drain valve comprising a body, a sleeve connected at one end to the body and having an air inlet at its other end connected to the air bleed line, an air outlet in the body connected to said one end of said sleeve, an adjustable bleed valve in said air outlet, a solenoid coil surrounding the sleeve and connected in circuit with the electric motor, a reciprocable armature in the sleeve provided with valve means for controlling flow between the air inlet and air outlet, means biasing the valve means and armature to open position, means forming a water release passageway in the body having a water inlet connected to said water drain line and having a water outlet, a normally closed water drain valve in the body between the water inlet and water outlet, and means responsive to the pressure of bleed air between the air inlet and air outlet for opening the water drain valve.

9. In an air compressing system of the type including a compressor, an electric motor for driving the compressor, a receiver connected to the compressor, a check valve between the compressor and receiver, an air bleed line connected between the compressor and check valve, and a water drain line connected to the receiver, a combination compressor air pressure relief and receiver water drain valve comprising a body, a sleeve connected at one end to the body and having an air inlet at its other end connected to the air bleed line, an air outlet in the body connected to said one end of said sleeve, an adjustable bleed valve in said air outlet, a solenoid coil surrounding the sleeve and connected in circuit with the electric motor, a reciprocable armature in the sleeve having valve means for controlling flow between the air inlet and air outlet, means biasing the armature and valve to open position, means forming a water release passageway in the body having a water inlet connected to said water drain line and having a water outlet, a water drain valve in the body between the water inlet and water outlet, a spring biasing said water drain valve to closed position, means forming a chamber in the valve body having an inlet passageway between the sleeve and bleed valve, and a piston in the chamber operable by pressure of bleed air between said air inlet and air outlet and operatively connected to the water drain valve for opening said water drain valve.

10. In an air compressing system of the type including a compressor, an electric motor drivingly connected to the compressor, a receiver communicating with the compressor, a check valve between the compressor and receiver, an air bleed line between the compressor and check valve, and a water drain line connected to the receiver, a combination compressor air pressure relief and receiver water drain valve comprising a valve body having an air release passageway provided with an air inlet connected to the air bleed line and provided with an air outlet, an adjustable bleed valve in said air outlet, a normally open armature actuated valve between the air inlet and air outlet, a solenoid connected in circuit with the electric motor for actuating the armature, means forming a water drain passageway in the valve body having an inlet connected to said water drain line and having an outlet, means forming a cylindrical chamber in the valve body communicating with said air release passageway, a piston in the cylinder movable in one direction by bleed air pressure between the air inlet and the air outlet, a rod extending from the piston in said one direction, a valve seat in the water drain passageway having a central opening larger than said rod through which the rod is adapted to extend when the piston moves in said one direction, a water drain valve on the opposite side of the valve seat from the piston and adapted to be unseated by the rod, radial ports in the water drain passageway connected to the water inlet, said ports being covered by the water drain valve in the seated position thereof and being adapted to be uncovered when the valve is displaced from seated position by said rod, and a spring for biasing the water drain valve to closed position.

11. The combination with an air compressor system including a compressor, an electric motor for driving the compressor, a receiver connected to the compressor, a check valve between the compressor and receiver, an air bleed line between the compressor and check valve, and a water drain line connected to the receiver, of an electrically operated two-way normally open valve comprising a valve body having an air release passageway provided with an air inlet connected to the air bleed line and a restricted air outlet, a solenoid connected in circuit with the electric motor, an armature valve actuated by the solenoid disposed between the air inlet and the air outlet, means biasing the armature valve to open position, means for forming a water release passageway in the valve body having a water inlet connected to the water drain line and having a water outlet, a normally closed water drain valve between the water inlet and water outlet, and pressure responsive means operatively connected to the water drain valve and communicating with the air release passageway between the armature valve and restricted air outlet for opening the water drain valve responsive to bleed air pressure between the armature valve and air outlet.

12. The combination with an air compressor system including a compressor, an electric motor drivingly connected to the compressor, a receiver communicating with the compressor, a check valve between the compressor and receiver, an air bleed line between the compressor and check valve, and a water drain line connected to the receiver, of a valve body having an air release passageway formed with an air inlet connected to the air bleed line and an air outlet, an adjustable bleed valve in the air outlet, a normally open valve between the air inlet and air outlet, a solenoid coil connected in a circuit with the motor, a reciprocable armature controlled by the coil and connected to the valve to close the air flow passage when the compressor is running, means forming a water drain passageway in the valve body having a water inlet connected to the water drain line and having a water outlet, a water drain valve separating the water inlet and water outlet, a spring biasing said water drain valve to closed position, means forming a cylindrical chamber in the valve body connected to said air release passageway, and a piston in said cylinder connected to said water drain valve for opening the water drain valve responsive to bleed air pressure in said flow passage sufficient to overcome the bias of said spring.

References Cited in the file of this patent
UNITED STATES PATENTS

| | | |
|---|---|---|
| 2,256,565 | Mantle | Sept. 23, 1941 |
| 2,462,614 | DeWitt | Feb. 22, 1949 |
| 2,505,663 | Churchman | Apr. 25, 1950 |
| 2,537,224 | Lansdale et al. | Jan. 9, 1951 |
| 2,576,578 | Dalrymple | Nov. 27, 1951 |
| 2,587,357 | McPherson | Feb. 26, 1952 |
| 2,598,361 | Dach | May 27, 1952 |
| 2,687,841 | Churchman | Aug. 31, 1954 |
| 2,700,397 | Compton | Jan. 25, 1955 |
| 2,739,605 | Smith | Mar. 27, 1956 |
| 2,799,293 | Clay | July 16, 1957 |

FOREIGN PATENTS

| | | |
|---|---|---|
| 831,787 | Germany | Feb. 12, 1952 |